(12) United States Patent
Oka et al.

(10) Patent No.: US 6,799,183 B2
(45) Date of Patent: Sep. 28, 2004

(54) OPERATION ASSISTANCE METHOD AND SYSTEM AND RECORDING MEDIUM FOR STORING OPERATION ASSISTANCE METHOD

(75) Inventors: Yoshiro Oka, Tokyo (JP); Takahiro Tanida, Tokyo (JP); Shoji Konno, Tokyo (JP); Chiaki Hirai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 09/910,207

(22) Filed: Jul. 19, 2001

(65) Prior Publication Data

US 2002/0059182 A1 May 16, 2002

(30) Foreign Application Priority Data

Sep. 29, 2000 (JP) ........................................ 2000-302835

(51) Int. Cl.[7] .............................................. G06F 17/30
(52) U.S. Cl. .................... 707/102; 707/10; 709/203; 709/204; 705/8; 705/9; 705/29; 705/37
(58) Field of Search ............................ 705/37, 9, 8, 29; 707/102, 10; 709/224, 203

(56) References Cited

U.S. PATENT DOCUMENTS

| | | | |
|---|---|---|---|
| 4,804,825 A | | 2/1989 | Bitoh |
| 5,197,001 A | * | 3/1993 | Mukherjee .................... 705/29 |
| 5,548,506 A | * | 8/1996 | Srinivasan ..................... 705/8 |
| 5,890,158 A | * | 3/1999 | House et al. .................. 707/10 |
| 6,308,164 B1 | * | 10/2001 | Nummelin et al. ............ 705/9 |
| 6,393,410 B1 | * | 5/2002 | Thompson .................... 705/37 |
| 6,401,119 B1 | * | 6/2002 | Fuss et al. .................... 709/224 |
| 2003/0023677 A1 | * | 1/2003 | Morison et al. ............ 709/203 |

FOREIGN PATENT DOCUMENTS

| | | |
|---|---|---|
| EP | 0152024 A | 8/1985 |
| EP | 0402759 A | 12/1990 |
| EP | 0670561 A | 9/1995 |
| EP | 0945833 A | 9/1999 |
| JP | 6-250839 A | 9/1994 |
| JP | 8-95776 A | 4/1996 |
| JP | 9-319566 A | 12/1997 |
| JP | 11-184874 A | 7/1999 |
| JP | 2000-215038 A | 8/2000 |
| WO | WO 0024890 A | 5/2000 |
| WO | WO 0131477 A2 | * 5/2001 |
| WO | WO 0219212 A2 | * 3/2002 |
| WO | WO 221310 A2 | * 3/2002 |
| WO | WO 0255531 A2 | * 3/2002 |

OTHER PUBLICATIONS

European Search Report for EP 01113297 dated Oct. 31, 2003.

* cited by examiner

*Primary Examiner*—Frantz Coby
(74) *Attorney, Agent, or Firm*—Townsend and Townsend and Crew LLP

(57) ABSTRACT

A work assistance method previously stores at least a plurality of work items required for a predetermined project work, a plurality of work products to be achieved for the respective work items, and a plurality of tools for processing for the respective work products in a mutually related state. The stored work items are displayed for selection, and a particular work products related to the work items among the work products and a plurality of tools for processing are displayed on the same screen. A particular tool is selected from the plurality of tools and executed.

14 Claims, 14 Drawing Sheets

FIG. 2

| USER ID | ATTRIBUTE | | |
| --- | --- | --- | --- |
| | MANAGERIAL POSITION ID | USER NAME | E-MAIL ADDRESS |
| U00 | SYSTEM ADMINISTRATOR | Admin | — |
| U01 | SYSTEM ADMINISTRATOR | UKIYA | ukiya@softcom |
| U02 | PROJECT LEADER | KAWATA | kawa@softcom |
| U03 | PROJECT MEMBER | NOYAMA | noya@softcom |
| U04 | PROJECT MEMBER | IKUSAWA | ikusa@softcom |
| ... | ... | ... | ... |

FIG. 3

| KNOWLEDGE TYPE | ID NAME | REFERENCE INFORMATION NAME | REFERENCE INFORMATION POSITION |
|---|---|---|---|
| RULES | R11 | DOCUMENT WRITING STANDARD | http://docr/R11/ |
| | R51 | APPROVING RULE | http://docr/R51/ |
| | R11 | DOCUMENT WRITING STANDARD | http://docr/R11/ |
| | ... | ... | ... |
| PROCEDURES | P51 | FUNCTIONAL SPECIFICATION WRITING PROCEDURE 1 | http://docp/P51/ |
| | P52 | FUNCTIONAL SPECIFICATION WRITING PROCEDURE 2 | http://docp/P52/ |
| | ... | ... | ... |
| KNOWLEDGE MEMOS | S51 | FUNCTIONAL SPECIFICATION WRITING EXAMPLE 1 | http://docs/S51/ |
| | S52 | FUNCTIONAL SPECIFICATION WRITING EXAMPLE 2 | http://docs/S52/ |
| | ... | ... | ... |

| TOOL ID | STARTING INFORMATION | TOOL NAME |
|---|---|---|
| PROJECT MEMBER ALLOCATION | http://WFolw/T01/ | PROJECT MEMBER ALLOCATION |
| FS EDITOR | http://Tools/T02/ | FUNCTIONAL SPECIFICATION EDITOR |
| EXAMINATION REQUEST | http://WFolw/T03/ | EXAMINATION REQUEST |
| REVIEW | http://WTools/T04/ | REVIEW ASSISTANCE TOOL |
| REVIEW JUDGMENT | http://WFolw/T05/ | REVIEW REPORT |
| APPROVAL REQUEST | http://WFolw/T06/ | APPROVAL REQUESTE |
| DOCUMENT REGISTRATION | http://Tools/T07/ | DOCUMENT REGISTRATION |
| KNOWLEDGE MANAGEMENT | http://Tools/T08/ | KNOWLEDGE INFORMATION MANAGEMENT |
| USER ADMINISTRATION | http://Tools/T09/ | USER ADMINISTRATION |
| RULE REGISTRATION | http://WFolw/T10/ | RULE REGISTRATION |
| PROCEDURE REGISTRATION | http://WFolw/T11/ | PROCEDURE REGISTRATION |
| KNOWLEDGE MEMO REGISTRATION | http://WFolw/T12/ | KNOWLEDGE MEMO REGISTRATION |
| ... | ... | ... |

| WORK ITEM ID 501 | WORK PRODUCT ID 502 | STATE ID 503 | PROJECT MEMBER ID 504 | DEADLINEN 505 | WORK PRODUCT INFORMATION 506 |
|---|---|---|---|---|---|
| W11 | PJ1 | APPROVAL COMPLETED | U02 | 2000.5.1 | http://pj01/doc/PJ1/ |
| W31 | SY1 | APPROVAL COMPLETED | U03 | 2000.5.9 | http://pj01/doc/SY1/ |
| W41 | BS1 | EXAMINATION COMPLETED | U03 | 2000.5.22 | http://pj01/doc/BS1/ |
| W51 | FS1 | UNDER WRITING | U03 | 2000.6.9 | http://pj01/doc/FS1/ |
| W51 | FS2 | UNDETERMINED | UNDETERMINED | UNDETERMINED | http://pj01/doc/FS2/ |
| W61 | DS1 | UNSTARTED | U03 | 2000.6.16 | http://pj01/doc/DS1/ |
| W71 | KP1 | UNSTARTED | U04 | 2000.6.23 | http://pj01/doc/KP1/ |
| W81 | PT1 | UNSTARTED | U04 | 2000.6.30 | http://pj01/doc/PT1/ |
| W81 | FH1 | UNSTARTED | U04 | 2000.7.7 | http://pj01/doc/FH2/ |
| W91 | ST1 | UNSTARTED | U04 | 2000.7.14 | http://pj01/doc/ST1/ |
| W91 | FH2 | UNSTARTED | U04 | 2000.7.21 | http://pj01/doc/FH2/ |

| WORK PROCESS ID (600, 601) | WORK ITEM ID (602) | WORK ITEM NAME (603) |
|---|---|---|
| PJ01 | W11 | PROJECT PLAN |
| | W31 | SYSTEM DESIGN |
| | W41 | BASIC DESIGN |
| | W51 | FUNCTIONAL DESIGN |
| | W61 | DETAILED DESIGN |
| | W71 | TEST PLAN |
| | W81 | PROGRAM TEST |
| | W91 | SYSTEM TEST |
| PJ02 | W11 | PROJECT PLAN |
| | W52 | FUNCTIONAL DESIGN |
| | ... | ... |
| ... | ... | ... |

FIG. 7

| WORK ITEM ID | OUTPUT WORK PRODUCT ID | INPUT WORK PRODUCT ID | RULE ID/PROCEDURE ID/KNOWLEDGE MEMO ID | STATE ID | MANAGERIAL POSITION ID | TOOL ID |
|---|---|---|---|---|---|---|
| W51 | FS1 | PJ1, BS1 | R11; P51; S51 | * | * | KNOWLEDGE MANAGEMENT |
| | | | | * | * | PROJECT MEMBER ALLOCATION |
| | | | | * | * | DOCUMENT REGISTRATION |
| | | | | UNSTARTED | PROJECT MEMBER | FS EDITOR |
| | | | | UNDER CREATION | PROJECT MEMBER | EXAMINATION REQUEST |
| | | | | EXAMINATION COMPLETED | PROJECT LEADER | REVIEW |
| | | | | UNDER REVIEW | PROJECT MEMBER | DECISION AFTER REVIEW |
| | | | | REVIEW COMPLETED | PROJECT MEMBER | APPROVAL REQUEST |
| | FS2 | PJ1, BS1 | R11; P51; S51 | * | * | KNOWLEDGE MANAGEMENT |
| | | | | * | * | PROJECT MEMBER ALLOCATION |
| W61 | ... | ... | ... | ... | ... | ... |
| ... | | | | | | |

| ID TYPE | ID NAME | DISPLAY CHARACTER |
|---|---|---|
| WORK PRODUCT | PJ1 | PROJECT PLAN |
| | BS1 | SYSTEM DESIGN |
| | FS1 | FUNCTIONAL SPECIFICATION (SUMMARY PART) |
| | FS2 | FUNCTIONAL SPECIFICATION (OPERATION PART) |
| | ... | ... |
| STATE | <UNDETERMINED> | <UNDETERMINED> |
| | UNSTARTED | UNSTARTEINED |
| | ... | ... |

800  801  802  803

OPERATION ASSISTANCE METHOD AND SYSTEM AND RECORDING MEDIUM FOR STORING OPERATION ASSISTANCE METHOD

BACKGROUND OF THE INVENTION

The present invention relates to a system and method for assisting a project work, e.g., development of software, and a recording medium for storing the method.

Improvements in efficiency of a work using the knowledge of a project member are disclosed in JP-A-11-184874 and others. Here is described a method of collecting, storing and retrieving knowledge, which enables to refer to necessary knowledge information by accumulating knowledge information such as a detailed work procedure and a problem-solving technique as written information so to share such knowledge information, arranging and classifying the accumulated knowledge information, and giving retrieval criteria thereto so that necessary knowledge information can be referred to.

But, the above prior art does not indicate the provision of knowledge information to users. In other words, it does not describe specifically what knowledge information is provided to the users and how.

SUMMARY OF THE INVENTION

It is an object of the invention to provide knowledge information and tools required for a management to improve the efficiency of the work by a project member.

As one of means for achieving the above object, a plurality of work items, a state of an outcome related to at least one of the work items and a tool related to the outcome are displayed on a single screen. Indication of such interrelated information can decrease the contents to be displayed and improve the work efficiency.

Tools related to all the work items can also be designed not to be related to them in a list of work items but to be kept displayed at a separate position in order to improve the work efficiency.

The work efficiency can also be improved because the contents to be displayed can be determined in more detail by showing the tools to be displayed in connection with attribute information such as a state of an outcome and a user's managerial position on the same screen.

And, the work efficiency can be improved by managing the state of the work product by a flow which previously defines the changes in the state of the outcome and changing the displayed details every time the state is changed.

BRIEF DESCRIPTION OF THE DRAWINGS

FIG. 2 is a configuration diagram showing a user DB table, which is a block diagram showing a whole image of processing by the project management assistance system.

FIG. 3 is a structure diagram showing the structure of a rule procedure DB table.

FIG. 4 is a configuration diagram showing a tool DB table.

FIG. 5 is a structure diagram showing the structure of a work result DB table.

FIG. 6 is a structure diagram showing the structure of a process DB table.

FIG. 7 is a configuration diagram showing a work item DB table.

FIG. 8 is a structure diagram showing a work item DB auxiliary table.

DESCRIPTION OF THE EMBODIMENTS

The invention relates to a system and method which activate a tool according to for example a state of a work product and a user attribute such as a managerial position, and a recording medium which stores the method. Here, the work product means documents, diagrams, tables and others which are provided in any form recognizable by people and also data, programs and the like which can be processed by a processing unit such as a computer. The tool is an application program which implements a process to create documents, diagrams or tables, and to register, authenticate or approve the created documents, rules or procedures. P Detailed description will be made with reference to FIG. 1 to FIG. 14.

Figure 1:
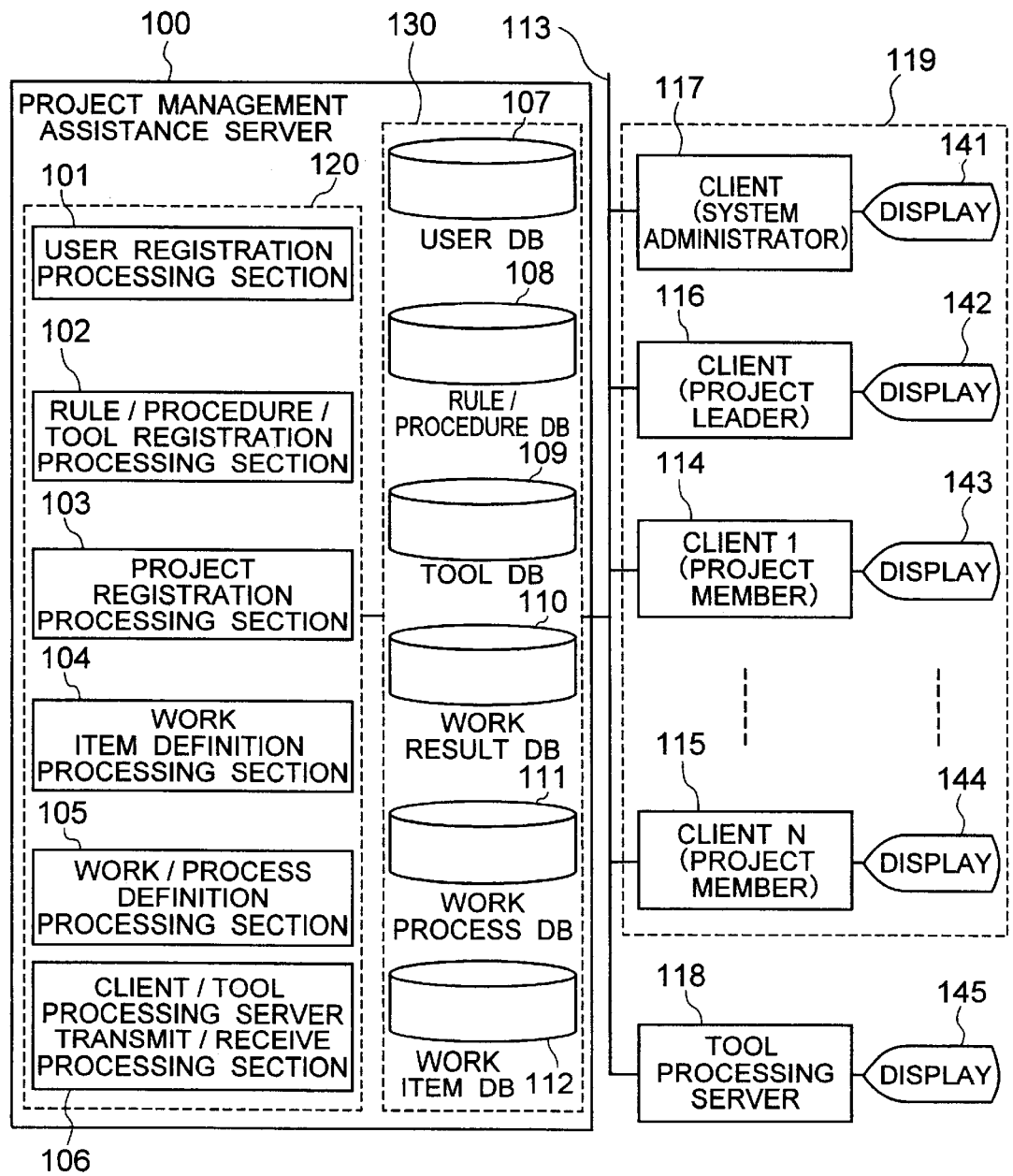
FIG. 1 is a diagram showing a whole structure of a project management assistance system.

FIG. 1 is a diagram showing the structure of a whole system. This system has project management assistance server 100, tool processing server 118 which provides a tool for assisting a work, and client 119 to be served by the server. Such processing unit groups mutually communicate through network 113. The client 119 includes client (processing unit for system administrator) 117, client (processing unit for leader) 116, client 1 (processing unit for project member 1) 114 to client N (processing unit for project member N) 115.

Such clients 117, 116, 114, 115 and the tool processing server 118 are respectively provided with displays 141, 142, 143, 144, 115.

The leader means a person administering a project member and a project. These clients are individual processing units for convenience of logical distinction depending on the services being provided but may be physically a single processing unit which plays a plurality of roles.

The project management assistance server 100 has storage device 130 which is comprised of databases (DB) including user DB 107, rule procedure DB 108, tool DB 109, work result DB 110, process DB 111 and work item DB 112.

To obtain information from the above databases and also to register and update information, the server 100 also has processing unit 120 which is comprised of user registration processing section 101, rule procedure tool registration processing section 102, project registration processing section 103, work item definition processing section 104, process definition processing section 105, client tool processing server transmit/receive processing section 106 which sends or receives information such as data between the client 119 and the tool processing server 118, and is connected to the storage device through an appropriate internal bus.

The user DB 107 is a database in which information on users is stored.

FIG. 2 shows the structure of table 200 of the user DB 107.

User ID 201 determines a character string which is uniquely allocated to each user in order to distinguish the users of the system. Attribute 202 is comprised of managerial position ID 203, user name 204 and address 205.

The managerial position ID 203 means the authority of a user to indicate a range in which the user can receive the service. The user name 204 is used to indicate the name or title of the user on the screen. The address 205 is used to send some notifications from the project management assistance server 100 to the users.

The rule procedure DB 108 is a database which stores knowledge information such as rules and procedures, and information on knowledge memos describing know-how.

FIG. 3 shows the structure of table 300 of the rule procedure DB 108. The rule procedure DB is defined into three categories of rules, procedures and knowledge memos, and they are identified as data knowledge type 301. ID name 302 indicates ID character strings allocated to the rules, procedures and knowledge memos, respectively. Reference information name 303 stores character strings used to display such rule procedure information on the screen. Reference information position 304 indicates positions where data to be used to refer to the contents of the rules, procedures and design memos are actually stored.

The tool DB 109 is a database which stores information on tools to be used.

FIG. 4 shows the structure of table 400 of the tool DB 109. Tool information possessed by the tool processing server 118 of the system is stored in the table of the tool DB 109, in which data is stored so that the tools can be activated from the information. Tool ID 401 is ID character strings for identifying the tools, and activation information 402 indicates places where information necessary to activate the tools is stored. Tool name 403 shows character strings which indicate tool names to be shown on the screen of the client 1 (processing unit for project member 1) 114.

The work result DB 110 is a database where a work result is stored with the work product used as a key. This database is updated depending on the progress of the work.

FIG. 5 is a diagram showing the structure of table 500 of the work result DB 110 of a given project. The table 500 of the work result DB 110 exists for every project. In the table 500 of the work result DB 110, the state of the output work product, a project member and a deadline are stored into fields of state ID 503, project member ID 504 and deadline 505 with work item ID 501 and work product ID 502 used as keys. An entity of the output work product is stored in a place indicated by work product information 506.

The process DB 111 is a database which accumulates the definition of a process performed for the project.

FIG. 6 is a diagram showing the structure of table 600 of the process DB 111. Process ID 601 is allotted to every project, and work item ID 602 configuring the process ID 601 is defined. Process item name 603 stores work item names to be shown on the screen. The work item DB 112 is a database which accumulates definition information on the contents of works.

FIG. 7 is a diagram showing the structure of table 700 of the work item DB 112. Work item ID 701 includes ID character strings for identifying the work items. Output work product ID 702 designates outcome ID to be output by the work and can designate a plurality of them. Input work product ID 703 is data of outcomes which are referred in order to generate an output work product and stored by using ID name 802 of FIG. 8 which is described later. Where a single output work product has a plurality of input work products, they are delimited by a comma and stored. Rule ID/procedure ID/knowledge memo ID 704 stores information on rules, procedures and knowledge memos, which are referred to in order to prepare the output work product, by the ID name 302 of FIG. 3. State ID 705 and managerial position ID 706 are information indicating conditions for using the tool designated by tool ID 707. The character "*" is determined to mean all conditions and all managerial positions in terms of convenience and facilitation. For example, where the state ID 503 of the output work product of FIG. 5 is included in the state ID 705 and the user managerial position ID 203 is included in the managerial position ID 706, it is displayed on the screen so that the tool indicated by the tool ID can be activated.

FIG. 8 shows the structure of auxiliary table 800 of the work item DB 112. In the auxiliary table 800 of the work item DB 112, the display characters 803 to be shown on the screen can be taken out according to ID name 802.

ID type 801 is information for distinguishing whether the ID name 802 is an ID character string of the work product or an ID character string of the state.

The user registration processing section 101 registers, updates or deletes information on the user to be used in the user DB 107, or retrieves a user. The user registration processing section 101 performs processing upon a request from the client (processing unit for system administrator) 117 or a request from the client tool processing server transmit/receive processing section 106.

The rule procedure tool registration processing section 102 processes for registration, updating, deletion or retrieval of information on the rules, procedures, knowledge memos or tools in the rule procedure DB 108 or the tool DB 109. The rule procedure tool registration processing section 102 performs processing upon a request from the client (processing unit for system administrator) 117 or a request from the client tool processing server transmit/receive processing section 106.

The project registration processing section 103 defines real processes and real work items performed by the project, and performs processing for registration, update, deletion and retrieval of the work result DB 110 and processing for storage and retrieval of the result of the defined real work items into and from the work result DB 110. The project registration processing section 103 performs processing upon a request from the client (processing unit for leader) 116 or a request from the client tool processing server transmit/receive processing section 106. Information of the process DB 111 is referred to when defining the real processes, and information of the work item DB 112 is referred to when defining the work items.

The work item definition processing section 104 performs processing for registration, update, deletion and retrieval of data in the work item DB 112. The work item definition processing section 104 performs processing upon a request from the client (processing unit for system administrator) 117 or a request from the client tool processing server transmit/receive processing section 106.

The process definition processing section 105 performs processing for registration, update, deletion or retrieval of data in the process DB 111. The process definition processing section 105 performs processing upon a request from the client (processing unit for system administrator) 117 or a request from the tool processing server 118.

Figure 13:
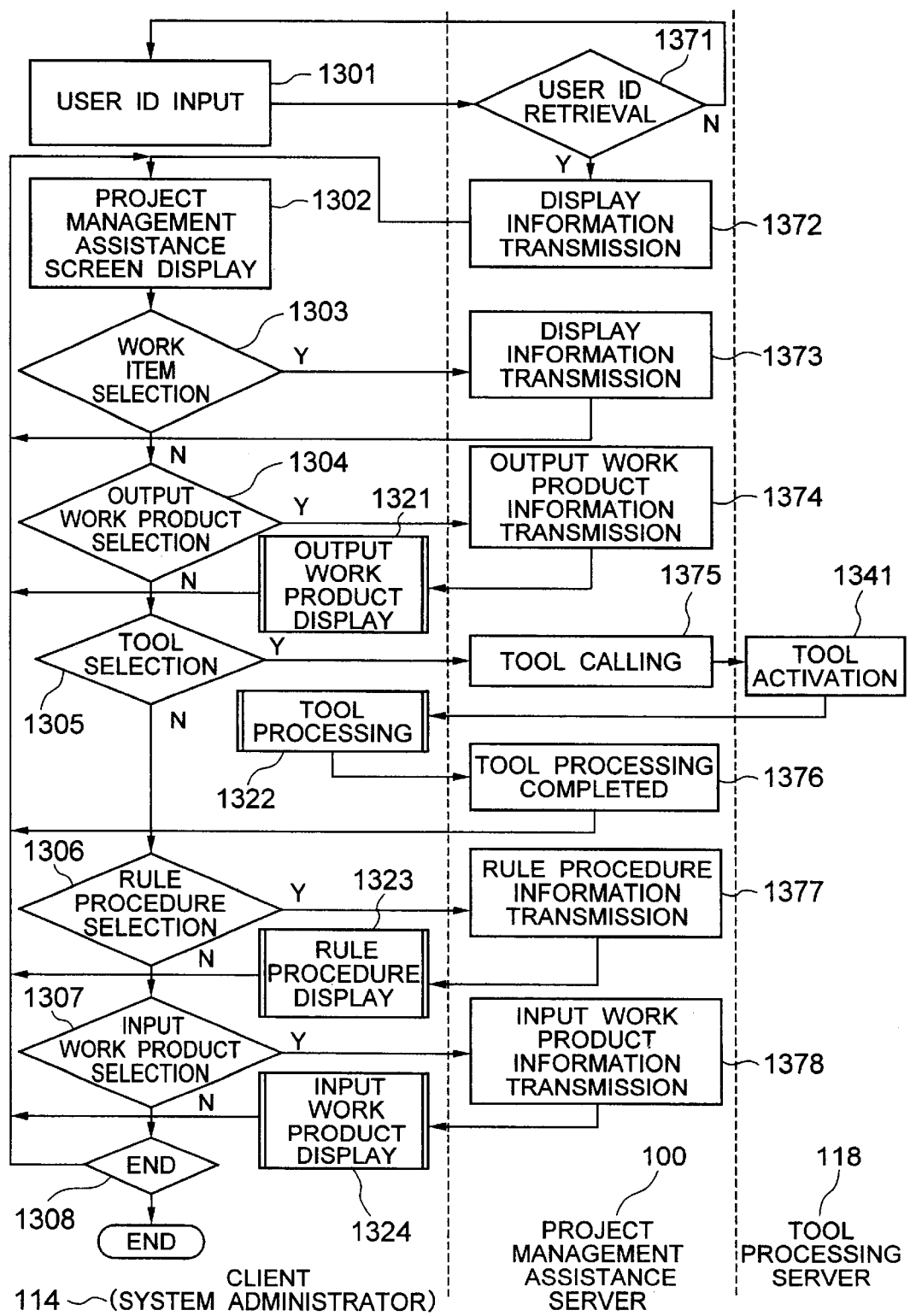
FIG. 13 is a diagram showing processing performed between a client (project member) and the project management assistance server.

The client tool processing server transmit/receive processing section 106 performs processing upon a request from the client 1 (processing unit for project member 1), the client N (processing unit for project member N) or the tool processing server 118. The client tool processing server transmit/receive processing section 106 performs the output processing of step 1372, step 1373, step 1374, step 1375, step 1376, step 1377 or step 1378 as shown in FIG. 13. Details (contents of client screen) to be shown are determined according to the user managerial position and the state of the outcome, and necessary information is provided to the user.

Figure 9:
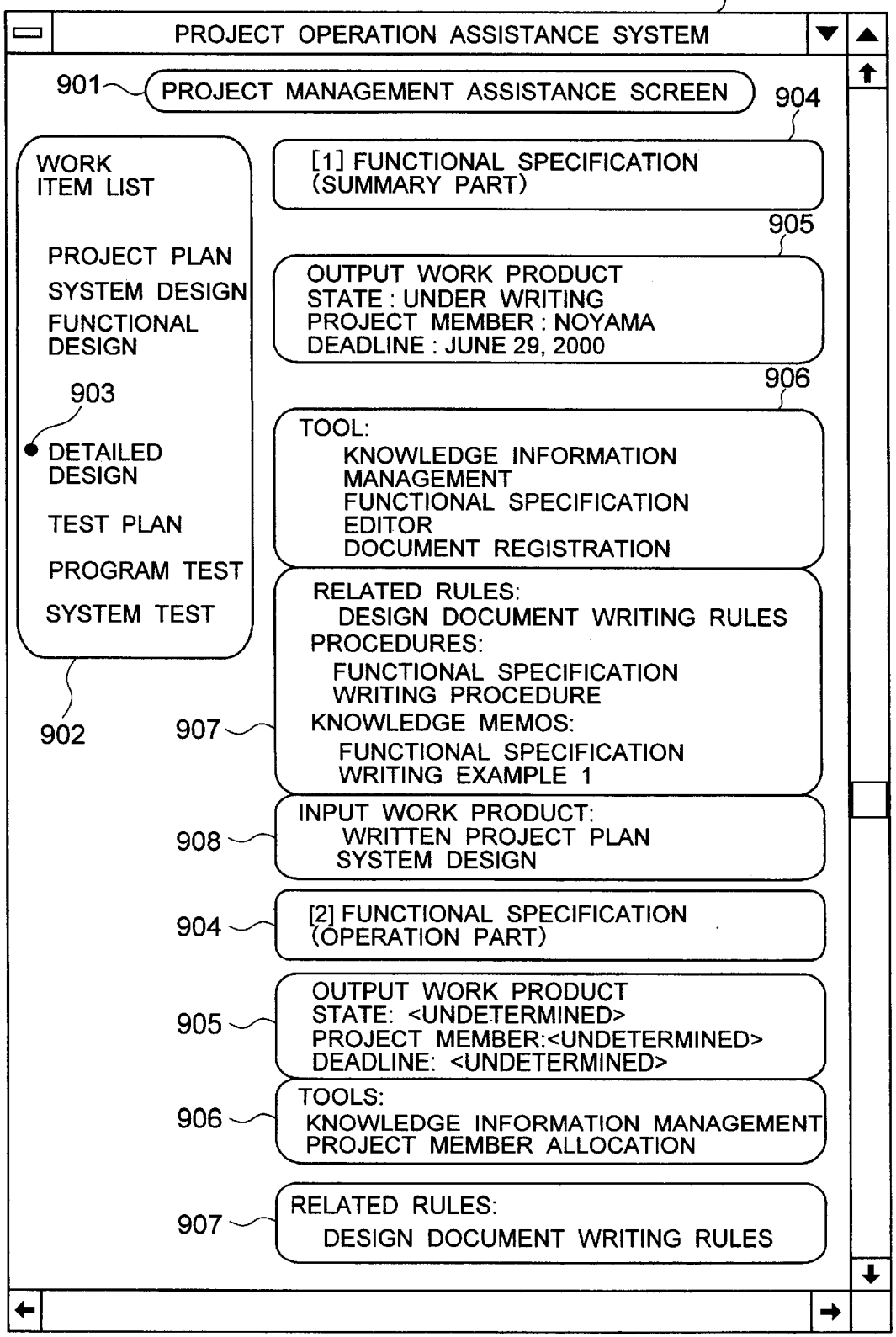
FIG. 9 is a screen example used by the project management assistance system.

FIG. 9 shows an example to be displayed on the screen of the client 119. It is a display example of project management assistance screen 900. Project characteristic display area 901 shows a project name for identification of the project. This project has processes (work items) shown in work item list display area 902. Every work item name is underlined to indicate that the individual work items configuring the process can be selected. Selection cursor 903 is shown on the left side of the selected work item, and information on the selected work item is shown in the right frame on the screen.

An area showing a name of the work product created by the selected work items is work product name display area 904. A creating state of the work product shown in the outcome name display area 904 is shown in output work product display area 905. Tools for the work product are shown in tool display area 906. Rules, procedures and knowledge memos related to the work product are shown in rule procedure display area 907. The work products to be referred to in order to create the output work product are shown in input work product display area 908.

Where a plurality of output work products are defined, information of the work product name display area 904 to the input work product display area 908 are displayed for each of the respective work products. Thus, all information is shown on the same screen.

The example shown in FIG. 9 is a screen display example on the display 143 of the client 1 (processing unit for project member 1) 114 when the user ID 201 is U03 and the project name is Project A. The selected work item is a functional design, and information of work items related to the functional design is shown in the right frame. One of work products created by the functional design is a functional specification (summary part), which is indicated to be under writing. A person in charge of creating the functional specification (summary part) and a writing deadline are also shown. As tools related to the functional specification (summary part), relevant knowledge information management, functional specification writing editor and document registration are selectably shown. The rule procedure is composed of three categories of related rules, procedures and knowledge memos, and as respective knowledge information, design documentation writing rules, functional specification writing procedures and functional specification writing example 1 are relevant and selectably shown. The input work product includes a written project plan and a system design sheet, which are output work products of a project plan and a system design and can be selected. Information on the second output work product, the functional specification (operation part), is subsequently displayed. As shown by the screen example of FIG. 9, necessary input information, output information, knowledge information and tool list are shown on correspondence with the relevant work items in the same screen.

Figure 10:
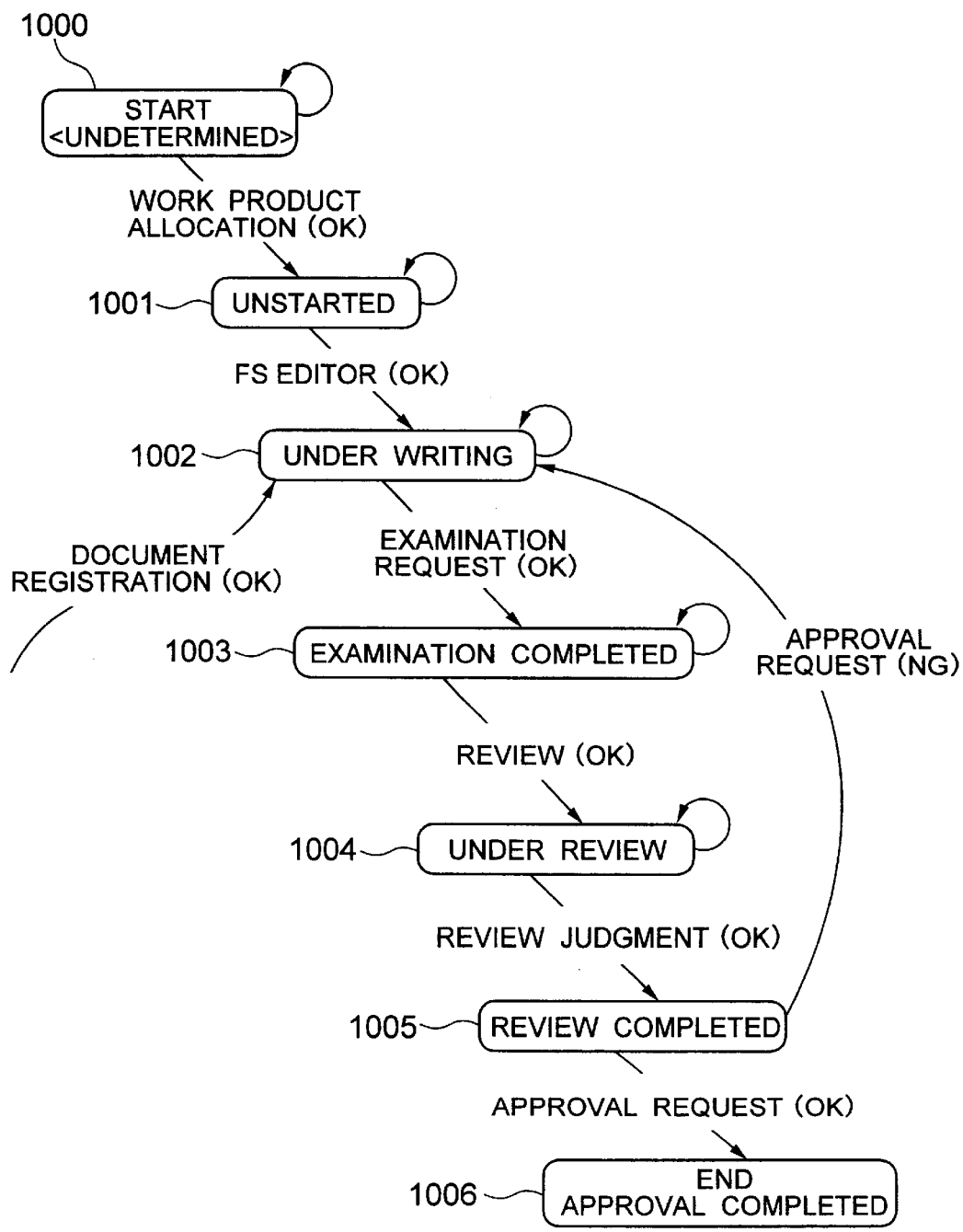
FIG. 10 is a state transition diagram showing states of work products.

FIG. 10 shows that the state of the "functional specification (summary part)" which is one of the work products is changing. The initial state of "functional specification (summary part)" is START <undetermined> 1000. According to the terminated state of a tool registered in this embodiment, the states of unstarted 1001, under-writing 1002, examination completion 1003, reviewing 1004, review completion 1005 and END approval completion 1006 are changed. Falling in the state of the END approval completion 1006 indicates that the work related to the "functional specification (summary part)" has completed.

The project management assistance server 100 has the above changes in the state for each work product previously determined, and the state changes according to the terminated state of the tool.

The operation of this system will be described.

Figure 11:
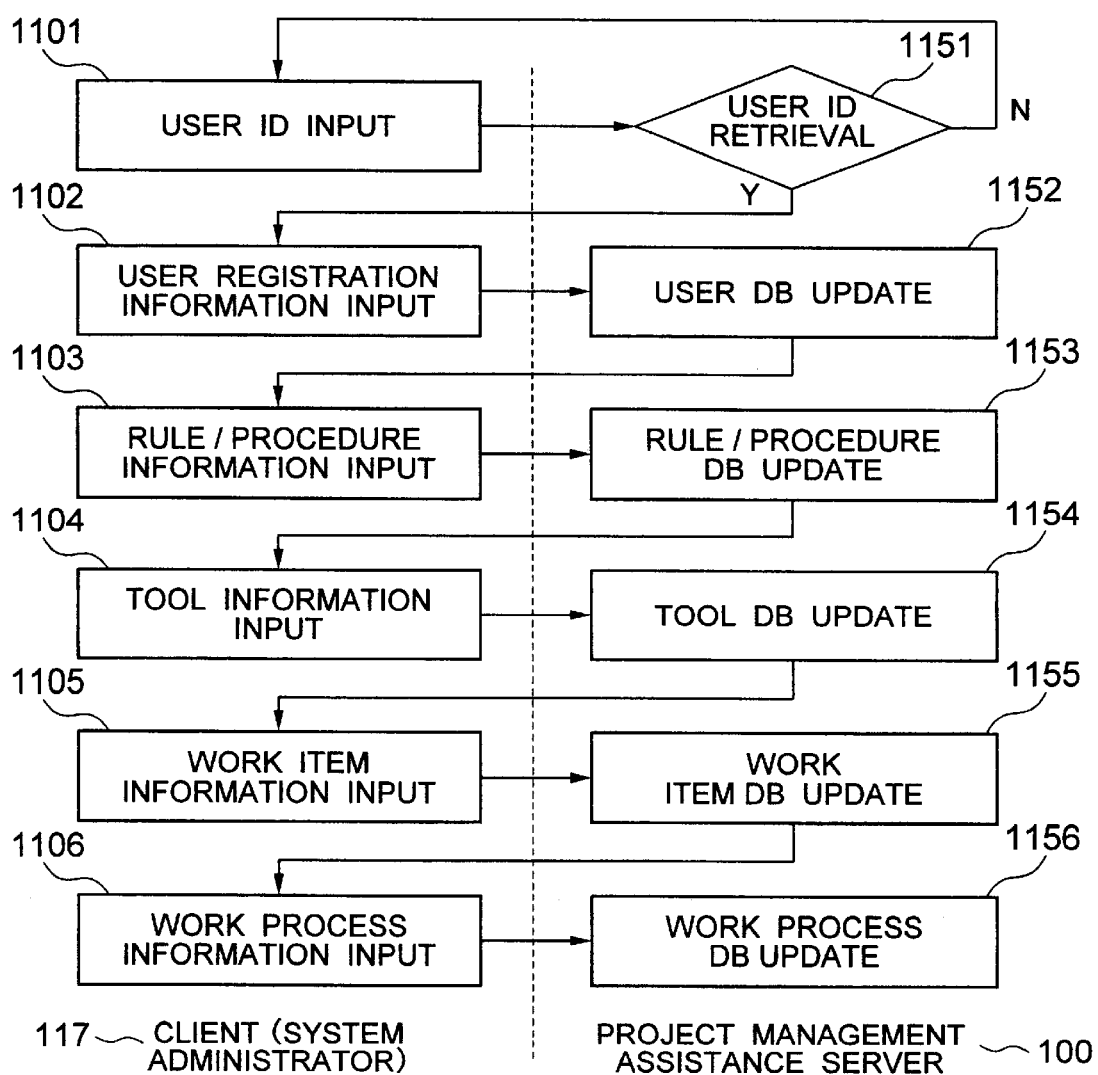
FIG. 11 is a diagram showing processing performed between a client (administrator) and a project management assistance server.

Referring to FIG. 11, processing for registration to each database and update by the client (processing unit for system administrator) 117 will be described.

In step 1101, the user ID 201 input by the processing performed by the client (processing unit for system administrator) 117 is transmitted to the user registration processing section 101. Step 1151 is part of the processing by the user registration processing section 101, and compares the input user ID 201 with data of the user DB 107 to judge whether it is of the system administrator. When it is judged as the proper user ID 201, the procedure proceeds to step 1102. If not, an error message is transmitted to the client (processing unit for system administrator) 117 to urge the input of the user ID 201 once again.

In step 1102, information necessary for registration of a new user or for changing or deleting registered user information is obtained from the client (processing unit for system administrator) 117 and sent to the user registration processing section 101. Here, the user information is assumed to be the user ID 201, the managerial position ID 203, the user name 204 or the address 205.

In step 1152, the user DB 107 is updated according to the information input in step 1102, and the procedure proceeds to step 1103.

In step 1103, information, which is required to change or delete the rule procedure information composed of the used rules, procedures and knowledge memos and the registered rule procedure information, is entered from the client (processing unit for system administrator) 117, and transmitted to the rule procedure tool registration processing section 102. Here, the rule procedure information is determined to be the knowledge type 301, the ID name 302, the reference information name 303 or the reference information position 304.

In step 1153, the rule procedure DB 108 is updated according to the rule procedure information input in step 1103, and the procedure proceeds to step 1104.

In step 1104, information required to change or delete the used tool information or the registered tool information is input from the client (processing unit for system administrator) 117, and transmitted to the rule procedure tool registration processing section 102. Here, the tool information is assumed to be the tool ID 401, the activation information 402 or the tool name 403.

In step 1154, the tool DB 109 is updated according to the tool information input in step 1104, and the procedure proceeds to step 1105.

In step 1105, information required to change or delete the used work item information or the registered work item information is input from the client (processing unit for system administrator) 117 and transmitted to the work item definition processing section 104. Here, the operation item information is assumed to be the work item ID 701, the output work product ID 702, the input work product ID 703, the rule ID/procedure ID/knowledge memo ID 704, the state ID 705, the managerial position ID 706, the tool ID 707, the ID type 801, the ID name 802 or display character string 803.

In step 1155, the work item DB 112 is updated according to the work item information input in step 115, and the procedure proceeds to step 1106.

In step 1106, information required to change or delete the used process information or the registered process information is input from the client (processing unit for system administrator) 117, and transmitted to the process definition processing section 105. Here, the process information is assumed to be the process ID 601, the work item ID 602 or the work item name 603.

In step 1156, the process DB 111 is updated according to the process information input in step 1106.

Figure 12:
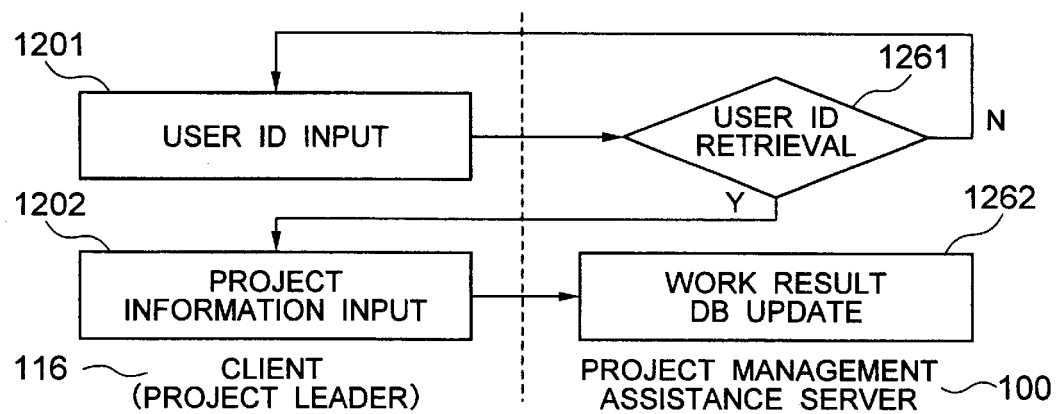
FIG. 12 is a diagram showing processing performed between a client (project leader) and the project management assistance server.

Then, processing operated from the client (processing unit for leader) 116 will be described with reference to FIG. 12.

In step 1201, the user ID 201 input by the processing performed by the client (processing unit for leader) 116 is transmitted to the user registration processing section 101. Step 1261 is part of the processing by the user registration processing section 101, and the input user ID 201 is compared with data of the user DB 107 to judge whether it is of the leader. When the proper user ID 201 is input, the procedure proceeds to step 1202. If not, an error message is transmitted to the client (processing unit for leader) 116 to urge to input the user ID 201 once again.

In step 1202, information required to change or delete the used process information or the registered process information is input from the client (processing for leader) 116 and transmitted to the project registration processing section 103. Here, the project information is assumed to be the project name, the work item ID 501, the outcome ID 502, the state-ID 503, the project member ID 504, the deadline 505 or the outcome information 506.

In step 1262, the work result DB 110 is updated according to the project information input in step 1202.

Then, processing related to the operation from the client 1 (processing unit for project member 1) 114 will be described with reference to FIG. 13.

In step 1301, the client 1 (processing unit for project member 1) 114 is used to prompt to input the user ID 201 and the project name (process ID). The input user ID 201 is transmitted to the user registration processing section 101. Step 1371 is part of the processing by the user registration processing section 101 and compares the input user ID 201 with data of the user DB 107 to determine whether it is of the project member. When the proper user ID 201 is entered, the procedure proceeds to step 1372. If not, an error message is transmitted to the client 1 (processing unit for project member 1) 114 to urge to input the user ID 201 and the project name (process ID) once again.

According to the process ID 601 input from the client 1 (processing unit for project member 1) 114, step 1372 selects the lists of the work item ID 602 and the work item name 603 from the table of the process DB and transmits to the client 1 (processing unit for project member 1) 114.

In step 1302, the list of the work item name 603 transmitted from the project management assistance server 100 in step 1372 is shown as indicated by 902 in FIG. 9. When the work item is selected in step 1303, screen information related to 904 to 907 of FIG. 9 are transmitted from the project management assistance server 100. In step 1302, the transmitted information is shown in 904 to 907 of FIG. 9. The processing in step 1373 will be described later.

In step 1303, when the user selects a work item of the work item display area 902, the procedure is branched to step 1373. The client 1 (processing unit for project member 1) 114 transmits the work item ID 602 corresponding to the selected work item to the project management assistance server 100.

In step 1373, according to the selected work item ID 602, screen information corresponding to 904 to 907 of FIG. 9 is transmitted to the client 1 (processing unit for project member 1) 114.

Figure 14:
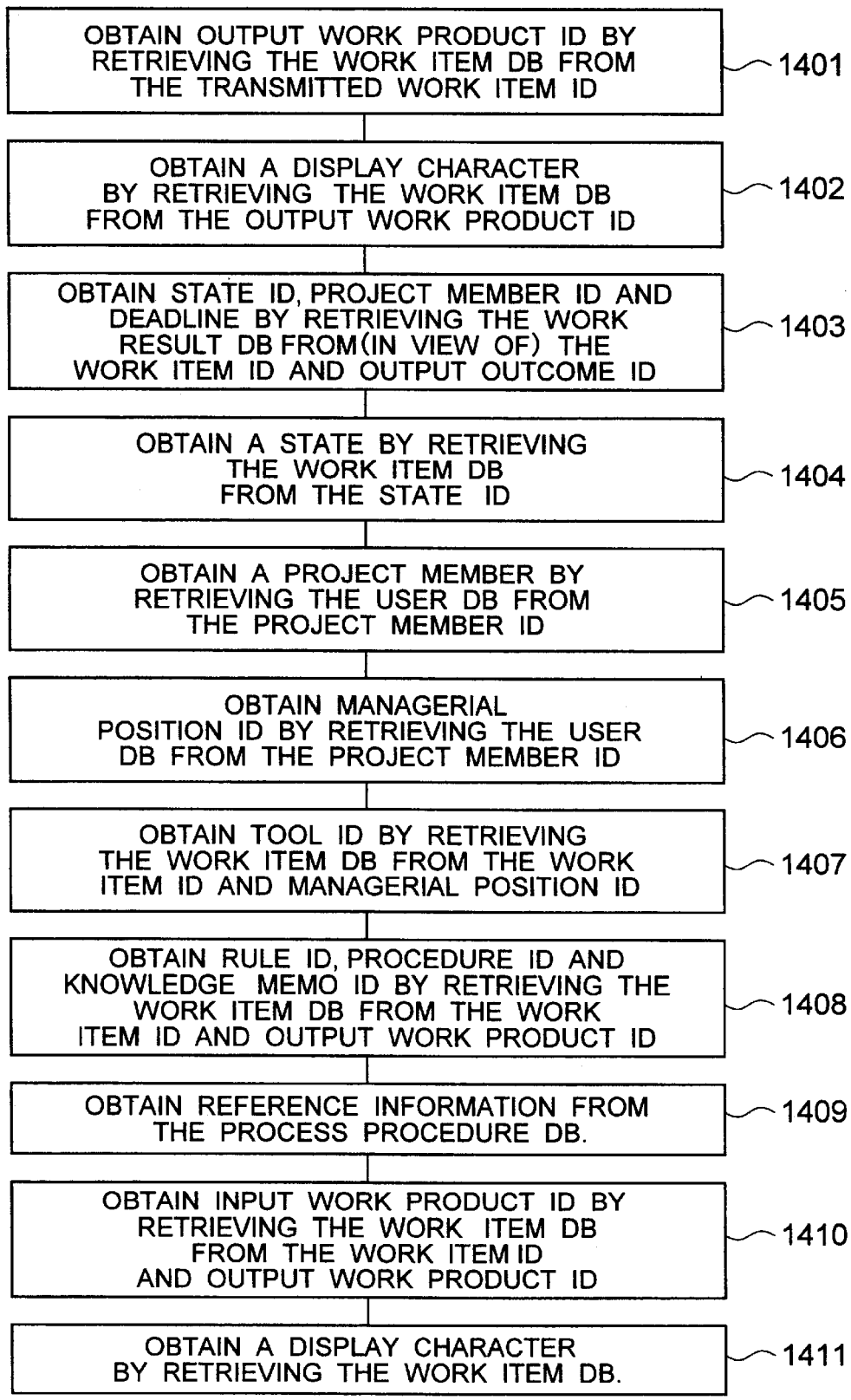
FIG. 14 is a diagram showing processing by the project work assistance server.

The screen information transmitted will be described with reference to FIG. 14.

Here, an example that a project member selects the "functional design" as the work item will be described. The work item ID corresponding to the "functional design" is W51 shown in FIG. 6.

First, in step 1401, the output work product ID 702 that the transmitted work item ID agrees with the work item ID of FIG. 7 is determined. In step 1402, the display character string corresponding to the output work product ID determined from the auxiliary table 800 of the work item DB of FIG. 8 is selected. The selected display character string is transmitted to the processing unit for project member 114. This step corresponds to the screen information shown in 904 of FIG. 9. Specifically, the output outcomes "FS1" and "FS2" are determined from the work item ID "W51" as shown in FIG. 7, and the "functional specification (summary part)" and "functional specification (operation part)" are selected from FIG. 8 and transmitted.

Then, in step 1403, the state ID 503, the project member ID 504 and the deadline 505 are determined from the table 500 of the work result DB 110 of FIG. 5 in view of the work item ID 701 and the output work product ID 702. In step 1404, for the state ID 503, the display character string 803 is selected from the work item auxiliary table 800 of FIG. 8. In step 1405, for the project member ID 504, the user name 204 is selected from the user DB table 200 of FIG. 2. The selected display character string 803, user name 204 and deadline 505 are transmitted to the client 1 (processing unit for project member 1) 114. This step corresponds to the screen information shown in 905 of FIG. 9. Specifically, in view of "W51" of the work item ID 701 and "FS1" and "FS2" of the output work product ID, the state ID's "under writing" and "<undetermined>", the project member ID's "U03" and "<undetermined>", and the deadline's "Jun. 9, 2000" and "<undetermined>" are selected from FIG. 5. For the state ID 503, the display character strings "under writing" and "<undetermined>" are selected from FIG. 8, and for the user ID 504, "Noyama" is selected from FIG. 2. And, they are sent to the client 1 (processing unit for project member 1) 114.

Then, in step 1406, the managerial position ID 203 is obtained from the project member ID 504. In step 1407, the tool ID 707 is selected from the work item DB 112 of FIG. 7 according to the state ID 503 and the managerial position ID 203. The selected tool ID 707 selects the tool name 403 according to the tool DB 109. The selected tool name 403 is transmitted to the client 1 (processing unit for project member 1) 114. This step corresponds to the screen information shown in the tool display area 906 of FIG. 9. When the output work product ID is "FS1", namely the functional specification (summary part), the project member ID is "U03", and the managerial position ID becomes the "project member" as shown in FIG. 2. And, the state ID becomes "under writing" as shown in FIG. 5. Thus, the tool ID selected from FIG. 7 becomes "knowledge management", "project member allocation", "document registration" or "examination request". According to the selected tool ID, the tool names "knowledge management", "project member allocation", "document registration" and "examination request" are selected from the table of the tool DB of FIG. 4. The selected tool names are transmitted to the processing unit for project member 114. The same processing and transmission are also performed when the output work product ID is "FS2", namely "functional specification (operation part)".

Then, in step 1408, the rule ID/procedure ID/knowledge memo ID 704 is selected from FIG. 7 according to the work item ID 701 and the output work product ID 702. The reference information name 303 is selected from the table 300 of the process procedure DB of FIG. 3 according to the respective IDs selected in step 1409. The selected reference information name 303 is transmitted to the client 1 (processing unit for project member 1) 114. This step corresponds to the screen information shown in 907 of FIG. 9.

Lastly, in step 1410, the input work product ID is selected from FIG. 7 according to the work item ID and the output work product ID. In step 1411, according to the individual IDs selected, the display character string is selected from the table of the work item DB of FIG. 8. The selected display character string is transmitted to the processing unit for project member 114. This step corresponds to the screen information shown in 908 of FIG. 9.

The screen information transmitted to the client 1 (processing unit for project member 1) 114 is shown on the screen in step 1302.

Step 1304 processes for branching when the output work product is selected. The client 1 (processing unit for project member 1) 114 transmits the selected output work product ID 502 to the project management assistance server 100.

The project management assistance server 100 retrieves the outcome information 506 corresponding to the output work product ID 502 selected in step 1374 from the table of the work result DB of FIG. 5 and transmits the stored data to the client 1 (processing unit for project member 1) 114.

The client 1 (processing unit for project member 1) 114 displays the work product data received in step 1321 onto the screen and, the procedure proceeds to step 1302.

Step 1305 processes for branching when the tool name 403 shown in the tool display area 906 is selected. The client 1 (processing unit for project member 1) 114 transmits the tool ID 401 corresponding to the selected tool name 403 to the project management assistance server 100.

Step 1375 retrieves the activation information 402 corresponding to the tool ID 401 selected in step 1305 from the tool DB table 400 of FIG. 4 and transmits it together with information of the client 1 (processing unit for project member 1) 114 to the tool processing server.

The tool processing server 118 activates the tool according to the activation information 402 received in step 1341 to enable communications with the client 1 (processing unit for project member 1) 114.

The client 1 (processing unit for project member 1) 114 processes the tool activated in step 1322 and waits the termination of the tool. After the tool has terminated, termination information is transmitted to the project management assistance server 100.

In step 1376, the project management assistance server 100 updates data of the state ID 503, the project member ID 504, the deadline 505 or the work product information 506 of the work result DB table 500 of FIG. 5 according to the termination information of the tool. The state changes according to FIG. 10, for example the state changes from "under writing" to "examination completion". Then, latest screen information is transmitted to the client 1 (processing unit for project member 1) 114, and the procedure proceeds to step 1302. For example, when the state ID changes from "under writing" to "examination completion", the tool changes from "knowledge management", "project member allocation", "document registration" and "examination request" to "knowledge management", "project member allocation", "document registration" and "review" as shown in FIG. 7. And, the address 205 is used to inform the user so that the user can check the update of the state.

Step 1306 processes for branching when the rule procedure is selected. ID 302 corresponding to the selected rule procedure is transmitted to the project management assistance server 100.

In step 1377, the project management assistance server 100 transmits storage data of the reference information position 304 corresponding to ID 302 selected in step 1306 to the client 1 (processing unit for project member 1).

Storage data of the reference information position 304 received in step 1323 is shown on the screen of the client 1 (processing unit for project member 1) 114 so that the user can refer to it. Then, the procedure proceeds to step 1302.

Step 1307 processes for branching when the input work product is selected. The work product ID 703 corresponding to the selected input work product is transmitted to the project management assistance server 100.

In step 1378, the project management assistance server 100 transmits storage data of the work product information 506 corresponding to the work product ID 703 selected in step 1307 to the client 1 (processing unit for project member 1) 114.

Storage data of the work product information 506 received in step 1324 is shown on the screen of the client 1 (processing unit for project member 1) 114 so that the user can refer to it. Then, the procedure proceeds to step 1302.

Step 1308 processes for branching to determine whether the user continues the operation by the client 1 (processing unit for project member 1) 114.

As described above, according to this embodiment, the project operator can refer to the rules, procedures and knowledge memos in the latest state by keeping the contents of the rule procedure DB table 900 in the latest state.

According to the embodiment of the invention, the project member and the administrator of the project are provided with the clarification of the work product to be created in order to conduct the operation of the product and can readily refer to the constraint, procedure and know-how for operating, including the work products of other projects. And, it also becomes easy to grasp the result of the work product and to share them for the project.

The tool for the work is completely standardized, and the structure of the work product is standardized by the tool. Thus, documents and the like created by the same tool can be used effectively for another project. Because the tool used is navigated depending on the managerial position of the user or the state of the work product, the user is free from being troubled with the tool selection or the like, and the work efficiency is improved.

In the embodiment, the tool usable is shown according to the state of the work product and the managerial position of the project member. By similarly controlling the rules, procedures and knowledge memos in association with the state of the outcome and the managerial position of the project member, the usable rules, procedures and knowledge memos can be shown in the same way.

In the embodiment, the individual processing units shown in FIG. 1 have a processor such as CPU a storage device as described above, and may be realized by providing the processing shown in FIG. 10 to FIG. 14 as a program. Accordingly, the individual processing units may be provided with a device which can read from a recording medium such as a floppy disk or an optical disk, and the processing shown in FIG. 10 to FIG. 14 may be stored as a program in the recording medium.

In the embodiment, the state ID, the project member ID and the deadline of the work result DB are updated according to the termination of processing of the tool. By controlling the project member ID and the deadline in association with the states shown in FIG. 10, the project member ID and the deadline can be updated when the state ID is changed.

According to the embodiment of the invention, knowledge and tools necessary for the work can be provided.

What is claimed is:

1. A work assistance method for a predetermined project work, comprising:

storing at least a plurality of work items required for a predetermined project work, at least one of related rule which is program name for processing the work and electronic document, procedure and knowledge memo to be referenced while processing for each of electronic document as a work product which become inputs for processing said work and electronic document as a plurality of work products generated by processing of the work in a mutually related state;

displaying the plurality of work items and selecting a work item from the plurality of work items;

displaying a particular work product related to the selected work item, program names for carrying out processing of the work product which is related to said selected work items, procedure and knowledge memo among said inputs and the plurality of work products to be generated on the same screen; and selecting to carry out a program from among said displayed program names so as to generate work product which should be generated.

2. The work assistance method according to claim 1, wherein selection items of related rules, procedures and knowledge memos associated with the selected work item are also displayed in addition to the display of the particular outcome and the selected tool, and one of the selection items is selected for reference.

3. The work assistance method according to claim 1, wherein the display of the program names is to display programs for performing the work related to an achieved state of the work product.

4. The work assistance method according to claim 3, wherein the display of the programs shows a state of the work product that the achieved state is changed upon termination of the execution of the selected program and the program related to the achievement state changed.

5. A work assistance method for a predetermined project operation, comprising:

storing at least a plurality of work items required for a predetermined project work, at least one of related rule which is program name for processing the work and electronic document, procedure and knowledge memo to be referenced while processing for each of electronic document as a work product which become inputs for processing said work and electronic document as a plurality of work products generated by processing of the work in a mutually related state, into a project assistance server;

transmitting work information designating a particular work from a client connected to the project assistance server to the project assistance server;

the project assistance server transmitting the work item specified by the work information transmitted from the client and the related outcomes and tools to the client;

the client referring to the work item and the related outcomes and tools transmitted from the project assistance server to select and transmit a particular tool to the project assistance server; and the project assistance server transmitting an achieved state of the work product at and tools for performing the work related to the achieved state to the client.

6. The work assistance method according to claim 5, wherein:

user information, which defines access privileges for each operator in association with the plurality of work items, the plurality of work products to be achieved for the plurality of work items and the plurality of tools for processing the plurality of work products, is stored in the project assistance server;

the client transmits the work information and also operator information which specifies the operator performing the work; and the project assistance server transmits the information to the server in the range of the access privileges according to the operator information.

7. A system for a predetermined project work, comprising a project management assistance server, which has a storage device for storing at least a plurality of work items required for a predetermined project work, at least one of related rule which is program name for processing the work and electronic document, procedure and knowledge memo to be referenced while processing for each of electronic document as a work product which become inputs for processing said work and electronic document as a plurality of work products generated by processing of the work in a mutually related state, and a processing unit for processing information stored in the storage device; and a client having a display device and receiving a service from the project management assistance server, wherein:

the display device shows the plurality of work items, a state of a work product related to one of the plurality of work items, a tool related to the state of the work product, and tools not related to the state of the work product.

8. The work assistance system according to claim 7, wherein:

the storage device also stores the rules, procedures and knowledge memos related to the work items; and the display device displays any one of the related rules, procedures and knowledge memos related to the work items on the same screen.

9. The work assistance system according to claim 7, wherein:

the storage device also stores a flow which defines a state transition of the work product; and the processing unit performs the state transition of the work product according to the flow upon completion of the tool and reads the tool related to the state of the transitioned work product from the storage device.

10. A recording medium for a predetermined project work, which stores at least a plurality of work items required for the project, at least one of related rule which is program name for processing the work and electronic document, procedure and knowledge memo to be referenced while processing for each of electronic document as a work product which become inputs for processing said work and electronic document as a plurality of work products generated by processing of the work in a mutually associated state and can be read by a computer.

11. The recording medium according to claim 10, wherein the programs are programs for performing a work related to an achieved state of the work product at a predetermined time.

12. The recording medium according to claim 11, wherein the programs are those related to a state of the work product that the achieved state has transitioned upon termination of the selected program and the achieved state transitioned.

13. A recording medium for a predetermined project work, which stores a program and can be read by a computer, comprising:

storing at least a plurality of work items required for the predetermined project work, at products at least one of related rule which is program name for processing the work and electronic document, procedure and knowledge memo to be referenced while processing for each of electronic document as a work product which become inputs for processing said work and electronic document as a plurality of work products generated by processing of the work in a mutually related state, into a project assistance server;

transmitting work information designating a particular work from a client connected to the project assistance server to the project assistance server;

the project assistance server transmitting the work item specified by the work information transmitted from the client and the related outcomes and tools to the client;

the client referring to the work item and the related outcomes and tools transmitted from the project assistance server to select and transmit a particular tool to the project assistance server; and the project assistance server transmitting an achieved state of the work product at that time and tools for performing the work related to the achieved state to the client.

14. A computer program which is run on a computer, comprising:

storing at least a plurality of work items required for a predetermined project work, at least one of related rule which is program name for processing the work and electronic document, procedure and knowledge memo to be referenced while processing for each of electronic document as a work product which become inputs for processing said work and electronic document as a plurality of work products generated by processing of the work in a mutually associated state;

displaying the plurality of work items and selecting any work item from them;

displaying a particular work product related to the selected work item among the plurality of work products and a plurality of tools for processing the work products on the same screen; and selecting any tool from the plurality of tools and executing it.

* * * * *